United States Patent [19]
Williamson

[11] 3,847,259

[45] Nov. 12, 1974

[54] SAFETY MECHANISM FOR SPECIAL MACHINES AND FIXTURES

[76] Inventor: Robert W. Williamson, 77 Cedar Acres, Brunswick, Ga. 31520

[22] Filed: Apr. 16, 1973

[21] Appl. No.: 351,516

[52] U.S. Cl. ............................... 192/131 R, 74/615
[51] Int. Cl. ............................................. F16p 3/18
[58] Field of Search............ 192/130, 131 R; 74/615

[56] References Cited
UNITED STATES PATENTS

| | | | |
|---|---|---|---|
| 2,427,928 | 9/1947 | Shaw | 192/131 R |
| 2,429,065 | 10/1947 | Korkowski | 192/131 R X |
| 3,047,116 | 7/1962 | Stiebel et al. | 192/131 R |
| 3,108,491 | 10/1963 | Buker | 74/615 |
| 3,490,310 | 1/1970 | Gill | 74/615 |

Primary Examiner—Allan D. Herrmann
Attorney, Agent, or Firm—Harness, Dickey & Pierce

[57] ABSTRACT

A hand restraint safety mechanism for use by an operator of a production machine wherein (absent the present invention) the operator's hand are exposed to the hazard of being caught by moving elements of the machine when the machine is stroked. The hand restraints for the operator's hands are operatively coupled via cables with a fluidic power cylinder which is mounted in fixed dimensional relation to the machine with which the safety mechanism is used. The power cylinder is operative between restraining and released positions to control the length of each cable extended from a housing on which cylinder is mounted. When the cables are maximally extended, the operator can reach into the machine to load or unload a workpiece. When the cables are minimally extended, the operator's hands are positively removed from the areas of the machine where they might be caught by moving machine elements. The operation of the restraint cylinder is via a pneumatic control circuit which is operatively coupled with the machine with which the safety mechanism is in use. Only when the power cylinder is in the restraining position can a machine stroke, i.e. a machine cycle, be initiated. During the machine stroke the power cylinder cannot operate to the released position. The safety mechanism includes a fail-safe valve means and circuit arrangement through which a fluidic machine start signal can be supplied to the machine only when the safety mechanism has positively removed both operator's hands from the danger area.

76 Claims, 12 Drawing Figures

3,847,259

SAFETY MECHANISM FOR SPECIAL MACHINES AND FIXTURES

BACKGROUND AND SUMMARY OF THE INVENTION

The present invention relates to a hand restraint safety mechanism for use by an operator of a machine having moving machine elements.

Heretofore, various types of hand restraining apparatus of the type to which the present invention relates have been used to remove the machine operator's hands from the path of travel of moving machine elements. In one type of prior hand restraint apparatus, the operator's hands are removed from the danger area as the machine operates. Thus, the operator's hands can still be in the danger area as the machine elements begin to move. Accordingly, an important object of the present invention is to provide a hand restraint safety apparatus which permits a machine cycle to begin only after the operator's hands have been removed from the path of travel of moving machine elements. The particular details of the present invention by which the foregoing object is attained include a novel control having a failsafe valve means operatively associated with the prime mover of the safety mechanism. A fluidic cycle start signal for the machine occurs only when the operator's hands are removed to a restraining position as sensed by the failsafe valve means. During the machine operating cycle the safety mechanism restrains the operator's hands in the restraining position and only after the machine cycle is concluded does the safety mechanism release whereby the operator can have manual access to the machine for loading and unloading workpieces only after the machine operating cycle is concluded. In the preferred embodiment of the invention disclosed herein, the safety mechanism comprises a pneumatic control circuit operatively coupled with the machine with which the safety mechanism is in use, and the particular details of this pneumatic circuit constitute further inventive features of the present disclosure.

The foregoing features of the invention along with additional features, advantages and benefits of the invention will be seen in the ensuing description and claims which are to be taken in conjunction with the accompanying drawings. The drawings illustrate a preferred embodiment of the invention in accordance with the best mode presently contemplated for carrying out the invention.

DESCRIPTION OF THE PREFERRED EMBODIMENT

Figure 1:
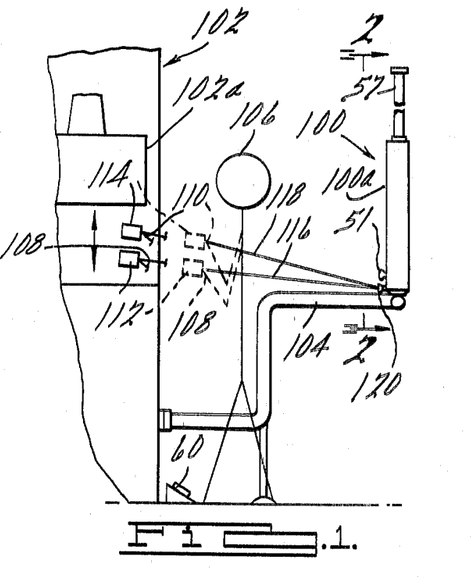
FIG. 1 is a side elevational view of a preferred form of safety mechanism according to the present invention mounted on and operatively coupled with a production machine and illustrating the usage of the present invention by the machine operator.
Figures 2, 6, 8, 9, 10:
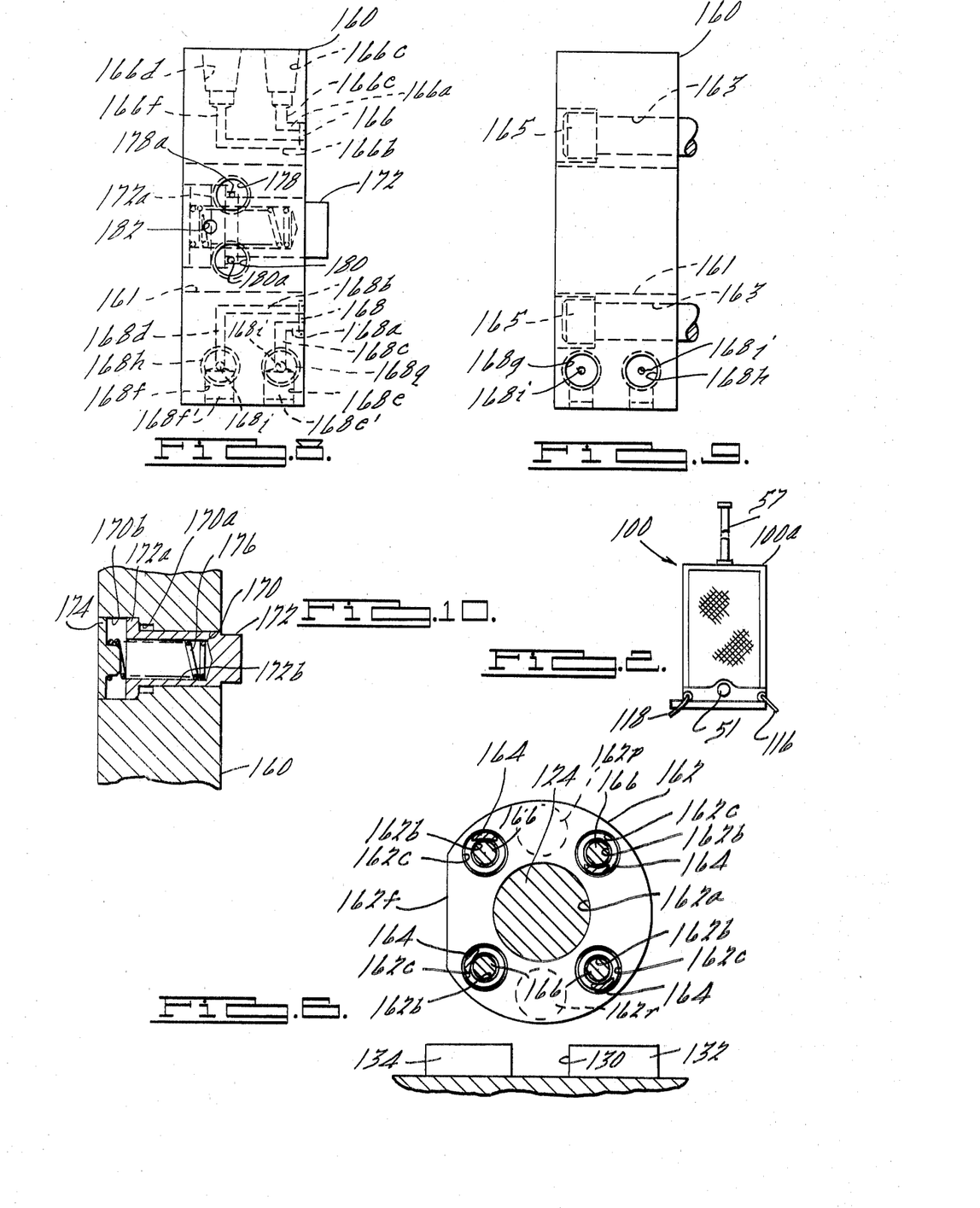
FIG. 2 is a view taken along line 2—2 in FIG. 1.
FIG. 6 is an enlarged sectional view taken along line 6—6 in FIG. 3.
FIG. 8 is a left, side-elevational view of FIG. 7.
FIG. 9 is a right, side-elevational view of FIG. 7.
FIG. 10 is an enlarged sectional view taken along line 10-10 in FIG. 7.

FIGS. 1 and 2 illustrate a safety mechanism 100 according to the present invention in use with a production machine 102 having a vertically reciprocally strokeable machine element 102a. Safety mechanism 100 comprises a housing 100a mounted in fixed dimensional relation to machine 102 by means of a mounting structure 104. Sufficient space is provided between housing 100a and machine 102 to accommodate a machine operator 106. The operator's hands 108 and 110 are respectively engaged with a pair of conventional hand restraints 112 and 114, respectively, which are attached to the ends of flexible restraining cables 116 and 118, respectively, extending from housing 100a. The solid line positions of hands 108 and 110 and hand restraints 112 and 114 illustrate safety mechanism 100 in the released position. In this position, sufficient lengths of cables 116 and 118 extend from housing 100a to permit operator 106 to move his hands 108 and 110 into the machine work area for loading and/or unloading a workpiece. Absent the present invention, the operator's hands are exposed to the hazard of being caught by machine element 102a during its stroke. In view of the relatively fast operating speeds of certain types of machines, this can be an extremely hazardous situation. The broken line positions of hand restraints 112 and 114 illustrate safety mechanism 100 in the restraining position. In this position, sufficient lengths of cables 116 and 118 are drawn into housing 100a so that operator 106 cannot move his hands 108 and 110 into the machine work area where they might be caught by machine element 102a. As will be explained in greater detail herein, the present invention prevents machine 102 from being cycled until safety mechanism 100 is in the restraining position, one of the inventive features involving the way in which the operation of safety mechanism 100 is interlocked with the operation of machine 102.

In order to facilitate the reader's understanding of the detailed description, the operation of safety mechanism 100 in relation to the operation of machine 102 is summarily described as follows. With machine element 102a stopped at its uppermost limit of travel, safety mechanism 100 operates to the released position thereby extending cables 116 and 118 from housing 100a. Operator 106 can now reach his hands into the work area to unload the completed workpiece from and then load a new workpiece into the machine. After the new workpiece has been loaded, operator 106 actuates a starting device which may be in the form of a foot pedal valve 60. Safety mechanism 100, in response to the actuation of valve 60, operates to the restraining position, thereby drawing cables 116 and 118 into housing 100a and positively removing the operator's hands from the path of travel of machine element 102a.

Only when safety mechanism 100 is at the restraining position can the machine operating cycle be initiated. In other words, machine element 102a can be stroked only after safety mechanism 100 has withdrawn the operator's hands from the danger area. During the stroke of machine element 102a, safety mechanism 100 prevents cables 116 and 118 from being extended from housing 100a. Thus, while machine element 102a is moving, the operator's hands are positively held out of its path of travel. Only after the machine has completed a cycle (that is, only after machine element 102a has been stroked) does safety mechanism 100 operate to the released position thereby extending cables 116 and 118 so that operator 106 can have manual access to the machine work area for unloading the completed workpiece and loading a new workpiece.

Details of safety mechanism 100 are shown in FIGS. 3–11. Attention is first directed to FIGS. 3–5 where housing 100a is seen to comprise a sturdily constructed rectangular cabinet 100a' having a vertical back wall 100b, top and bottom walls 100c, 100d, and side walls 100e, 100f. The open interior of cabinet 100a is enclosed by a removable cover which has been removed from FIG. 3 to expose the interior construction. Cable guides 120, 122 for guiding cables 116, 118 into and out of housing 100a are mounted at the lower corners of housing 100a. A pneumatic cylinder 57, hereinafter referred to as restraint cylinder 57, is centrally mounted on top wall 100c above housing 100a. A suitable circular opening 100g is provided in top wall 100c through which the rod 57a of restraint cylinder 57 extends into the interior of housing 100a. Rod 57a also passes through a valve body 160 on the inside of wall 100c, and details of body 160 will be explained later. As best seen in solid line positions (which as will become apparent represent the released position of the hand restraints), a bushing 124 is affixed to the free end of rod 57a, and a cable attaching member 126 in the form of a generally square plate is affixed to bushing 124. A roller 128 is mounted on member 126 and rides in a guideway 130, formed between a pair of guide members 132 and 134 on back wall 100b. A valve member 162 in the form of a generally round plate is mounted on bushing 124 and yieldably coupled with member 126. As will be explained later, valve member 162 is cooperatively associated with valve body 160, this arrangement constituting one of the inventive features disclosed herein. As best seen in FIG. 6, valve member 162 is journaled on bushing 124 by a large circular bore 162a to permit member 162 to slide lengthwise thereon. Four smaller threaded bores 162b are arranged 90° apart around bore 162a, and each is counterbored at 162c to receive one end of a coil spring 164. The other end of each coil spring 164 lodges in a corresponding counterbore 126b (FIG. 3) of a corresponding bore 126a in member 126. The threaded shanks of headed guide pins 166 are passed through bores 126a to engage bores 162b and thereby compress springs 164 such that member 162 is yieldably mounted for lengthwise displacement on bushing 124 relative to member 126. A pair of circular pads 162p, 162r are affixed to the upper surface of member 162 on opposite sides of bore 162a; as will be seen later, pads 162p, 162r close respective bores in valve body 160 when the safety mechanism is in the restraining position. Note also that the side of member 162 facing wall 100e has a flat 162f.

Figure 3:
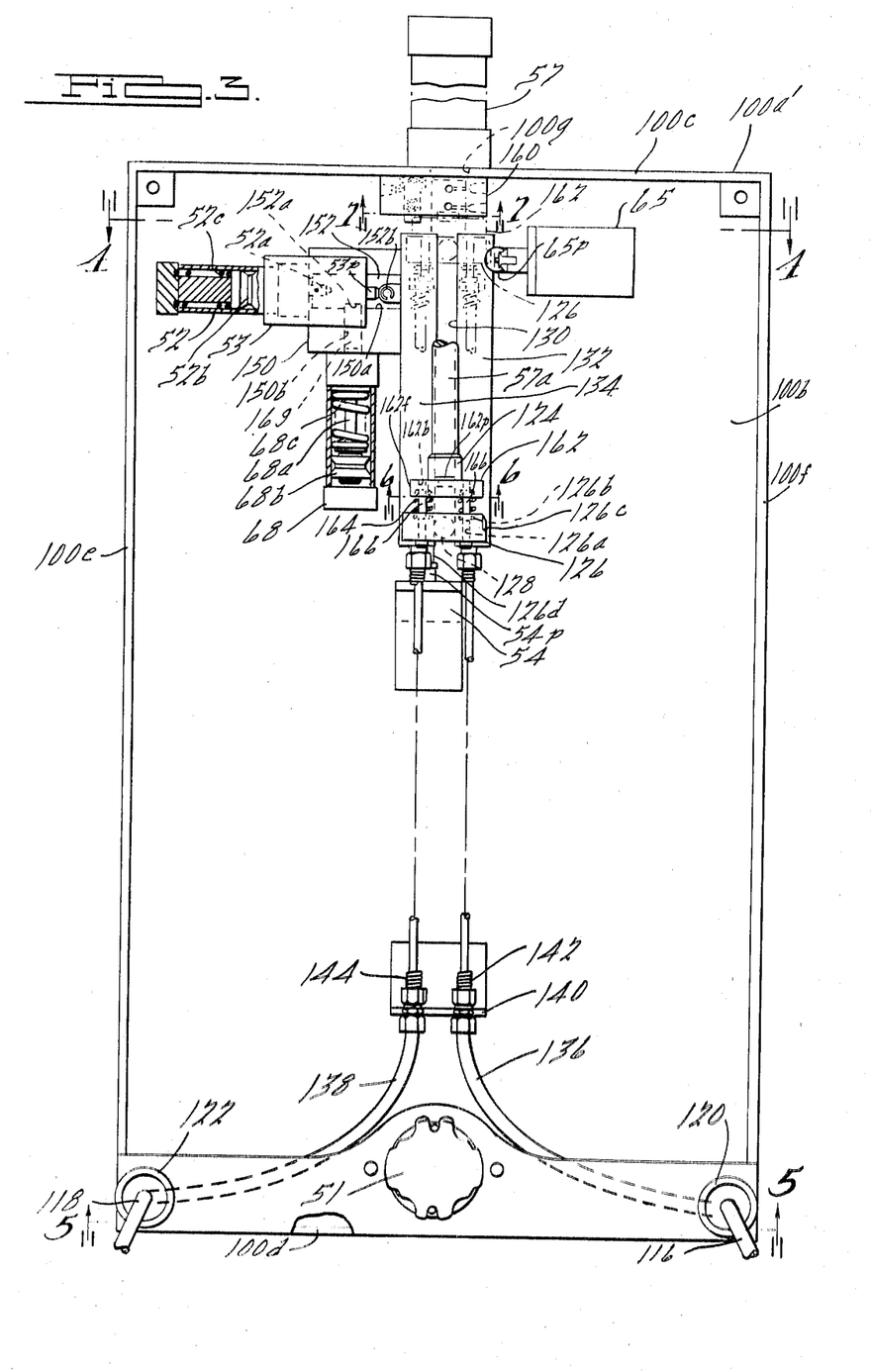
FIG. 3 is an enlarged view of FIG. 2 and having a portion removed.

A pair of cable guiding sleeves 136, 138 extend from cable guides 120, 122, respectively, to a mounting bracket 140 which is affixed to wall 100b in alignment with, but somewhat spaced from cable attaching member 126. Cables 116, 118, upon entering housing 100a via guides 120, 122, are guided through sleeves 136, 138, respectively, and the ends of the cables are affixed to member 126. Helical springs 142, 144 are disposed around each cable 116, 118, respectively, between member 126 and bracket 140 to assist in guiding the cables. When cylinder rod 57a is extended (solid line position of member 126, etc.), cables 116, 118 are extended from housing 100a to permit hand restraints 112, 114 to be displaced to the released position. When cylinder rod 57a is retracted (broken line position of member 126), cables 116, 118 are pulled into housing 100a, thereby retracting hand restraints 112, 114, and hence the operator's hands, to the restraining position. During operation of cylinder 57, roller 128 guides member 126 along guideway 130. It will be observed that with the safety mechanism in the restraining position, valve member 162 has been displaced on bushing 124 toward member 126 because of abutment with valve body 160 via the plastic pads 162p, 162r. Valve member 162 and valve body 160 are arranged in relation to the stroke of cylinder rod 57a such that pads 162p, 162r abut the lower surface of body 160 prior to cylinder rod 57a arriving at the retracted position. Thus, after pads 162p, 162r abut body 160 to arrest further travel of member 162 relative thereto, cylinder rod 57a continues along a final increment of travel toward the retracted position while member 162 is increasingly displaced on bushing 124 toward member 126 against the spring force of springs 164 with member 126 continuing to move with cylinder rod 57a over the final increment of travel toward the retracted position. When cylinder rod 57a is extended from the retracted position, member 162 initially remains in abutment with valve body 160 until member 126 has been extended to abut the heads of guide pins 166 after which member 162 also beings to move with cylinder rod 57a away from valve body 160.

Figure 4:
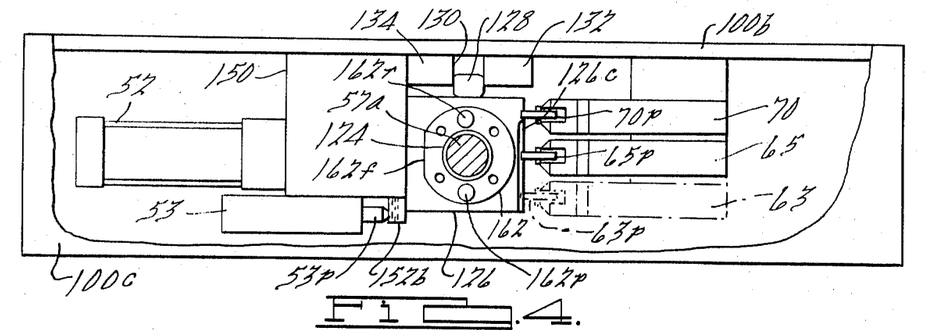
FIG. 4 is an enlarged view taken along line 4—4 in FIG. 3.
Figure 5:
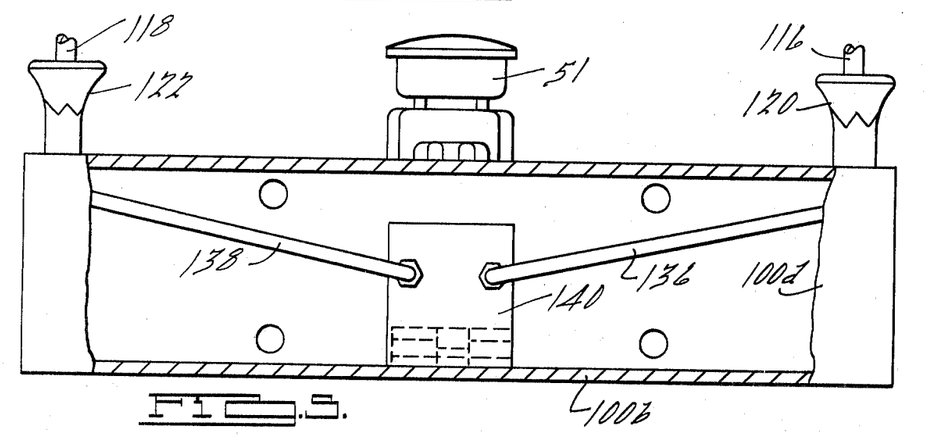
FIG. 5 is an enlarged view taken along line 5—5 in FIG. 3.
Figure 7:
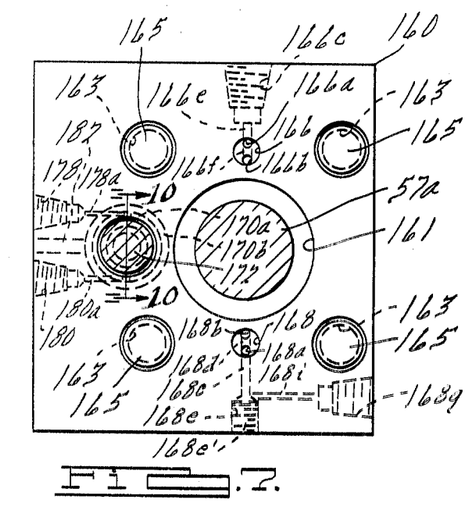
FIG. 7 is an enlarged sectional view taken along line 7—7 in FIG. 3.

A plurality of three valves, 54, 65 and 70, are mounted on wall 100b for actuation in accordance with the position to which member 126 is operated by cylinder 57. Valve 54 has a plunger 54p positioned for actuation by the head of a stud 126d threaded into a tapped hole in the bottom surface of member 126; valve 54 being disposed for operation to its actuated, or tripped, position when cylinder rod 57a is fully extended (i.e., hand restraints in the released position) and stud 126d provides a convenient adjustment for attaining this result. Valves 65 and 70 are stacked (FIG. 4) and have their roller-type plungers 65p and 70p positioned for actuation by member 126. A cam surface 126c is fashioned along a portion of the upper side edge of member 126 so that plunger 70p is actuated slightly before plunger 65p as member 126 approaches the restraining position. Thus both valves 65 and 70 are actuated when cylinder rod 57a is fully retracted (i.e., hand restraints in the restraining position), but with valve 70 being actuated slightly before valve 65 as the cylinder rod retracts. An additional valve 63, shown in phantom in FIG. 4, is also positioned to be tripped by member 126 at the same time as is valve 65, but valve 63 is used only in connection with the pneumatic control circuit of FIG. 12. A palm-button operated reset valve 51 is mounted on housing 100a between cable guides 120, 122. Details of the pneumatic circuit arrangement of the above valves will be covered in the description of FIG. 11.

In accordance with a further aspect of the invention, a mechanical interlock restricts the travel of cylinder rod 57a when the system supply line air pressure drops below a predetermined level. By way of example, this may occur when a nominal pressure of 80 psi drops below 60–65 psi. A rectangular block 150 is affixed to wall 100b along side the top end of guide 134. A guideway 150a is fashioned in block 150 at a right angle to the travel of cylinder rod 57a. A second guideway 150b is fashioned in block 150 to intercept guideway 150a at a right angle. A slide 152 is guided in guideway 150a and is shiftable lengthwise of the guideway into and out of the path of travel of member 126 by means of a pneumatic cylinder 52. Cylinder 52 has a cylinder rod 52a connected to a piston 52b and the latter is engaged by a coil spring 52c such that rod 52a, and hence slide 152, are urged to the extended position. (The drawing, however, illustrates cylinder 52 and slide 152 in the retracted position.) In the retracted position, slide 152 clears the path of travel of member 126, thereby permitting the latter to freely move between the release and restraining positions when cylinder 57 is operated. However, when cylinder rod 52a is fully extended, slide 152 is disposed within the path of travel of member 126, thereby restricting the travel of the latter. Thus, if member 126 is in the restraining (broken line) position (of FIG. 3) when cylinder 52 moves slide 152 into the path of travel of member 126, then it is impossible for cylinder rod 57a to be fully extending and thus hand restraints 112, 114 cannot be moved to the released position. If member 126 is in the released position when slide 152 is shifted into the path of travel of member 126, then member 126 cannot be brought to the restraining position, and as will be seen later, machine element 102a cannot be stroked. Note that with slide 152a extended, member 162 does not hit the slide because of the clearance provided by flat 162f. Another cylinder 68 is mounted on block 150 in alignment with guideway 150b. A slide 169 is affixed to the cylinder rod 68a of cylinder 68, and is guided in guideway 150b. A coil spring 68c biases the piston 68b of cylinder 68 to urge cylinder rod 68a and hence slide 169 toward the retracted position. (The drawing, however, illustrates cylinder 68 and slide 169 in the latched position.) With cylinder rod 68a in the retracted position, the end of slide 169 clears guideway 150a. However, when sufficient air pressure is introduced into the head end of cylinder 68, the bias of spring 68c is sufficiently overcome to move slide 169 into guideway 150a. With cylinder rod 52a retracted, slide 169 latches in a groove 152a fashioned in the side of slide 152. As long as sufficient air pressure continues to be supplied to cylinder 68, the latching engagement of slide 169 with groove 152a is maintained to hold slide 152 clear of the path of travel of member 126. However, when the supply line pressure drops below a predetermined level, the force of spring 68c is sufficient to remove slide 169 from groove 152a and when this happens, spring 52c urges slide 152 into the path of travel of member 126. This condition remains until the system is reset and sufficient air supply pressure again exists. This aspect along with the way in which cylinders 52 and 68 are connected in the pneumatic control circuit will be explained in greater detail in connection with the description of FIG. 11. A pilot supply valve 53 is mounted on block 150 and has its plunger 53p actuated by a pin 152b on slide 152 when the latter is out of the path of travel of member 126. The connection of valve 53 in circuit will also be covered in the description of FIG. 11.

In accordance with another inventive feature of the present arrangement, a failsafe circuit is provided whereby it is impossible for the machine to be operated when the hand restraints are in other than the restraining position, and for the hand restraints to be operated away from the restraining position so long as the machine is operating. This failsafe circuit is embodied in part by the construction details of valve body 160. Therefore, attention is directed to FIGS. 7–10 which illustrate these details. Body 160 is of generally square shape and mounted on the inside of top wall 100c in general alignment with cylinder 57. Valve body 160 comprises a large circular hole 161 aligned with hole 100g. Rod 57a passes through hole 161, and hole 161 is large enough to accommodate bushing 124 when cylinder rod 57a is retracted. Suitable holes 163 are arranged around hole 161 and suitable fasteners 165 are passed through these holes and matching holes in wall 100c and in the mounting flange of cylinder 57 whereby both cylinder 57 and body 160 are mounted to wall 100c. A pair of shallow bores 166, 168 are fashioned in the surface of member 160 which faces member 162, and are on diametrically opposite sides of hole 161. A pair of small, thin passages 166a, 166b extend upwardly through member 160 from the interior end of bore 166. A pair of holes 166c and 166d for reception of pneumatic line fittings are fashioned in one side of body 160 at right angles to passages 166a, 166b. A small, thin passage 166e extends into body 160 from the interior end of hole 166c to intercept the interior end of passage 166a. A small, thin passage 166f extends from the interior end of hole 166d to intercept the interior end of passage 166b. In similar fashion, a pair of small, thin passages 168a and 168b extend into block 160 from the interior end of bore 168. These two passages are intercepted by passages 168c and 168d, which latter passages extend from the interior ends of holes 168e and 168f formed in the side of member 160 opposite holes 166c and 166d. In order to effect connection of pneumatic line fittings at the side of member 160 which faces wall 100f, a pair of holes 168g and 168h are fashioned therein and small, thin passages 168i and 168j extend from the interior ends of these latter two holes to intercept passages 168c and 168d. Holes 168e and 168f are plugged by plugs 168e' and 168f'. As mentioned earlier, valve member 162 is cooperatively associated with valve body 160. When valve member 162 abuts valve body 160, pads 162p, 162r close on bores 166 and 168 respectively. With bore 166 closed by pad 162p, a pneumatic fluid path, through which a fluidic signal can pass, is created between hole 166c and hole 166d via passages 166e, 166a, bore 166, and passages 166b and 166f; and with bore 168 closed by pad 162r, a pneumatic fluid path, through which a fluidic signal can pass, is created between hole 168g and hole 168h via passages 168i, 168c, 168d, bore 168, and passages 168b, 168d and 168j. Thus these constructions provide a pair of novel valves which are identified by the numerals 66 and 64 in FIG. 12. Valves 66 and 64 will herein be referred to as failsafe valves 66 and 64; only valve 66 is used in the circuit of FIG. 11 while both valves are used in the circuit of FIG. 12. The fluid path through each valve 66, 64 is created immediately upon abutment of valve member 162 with body 160; since member 162 is yieldably mounted on member 126, each valve 66, 64 can condut a fluidic signal as member 126 moves over its final increment of travel to the restraining position.

Figure 11:
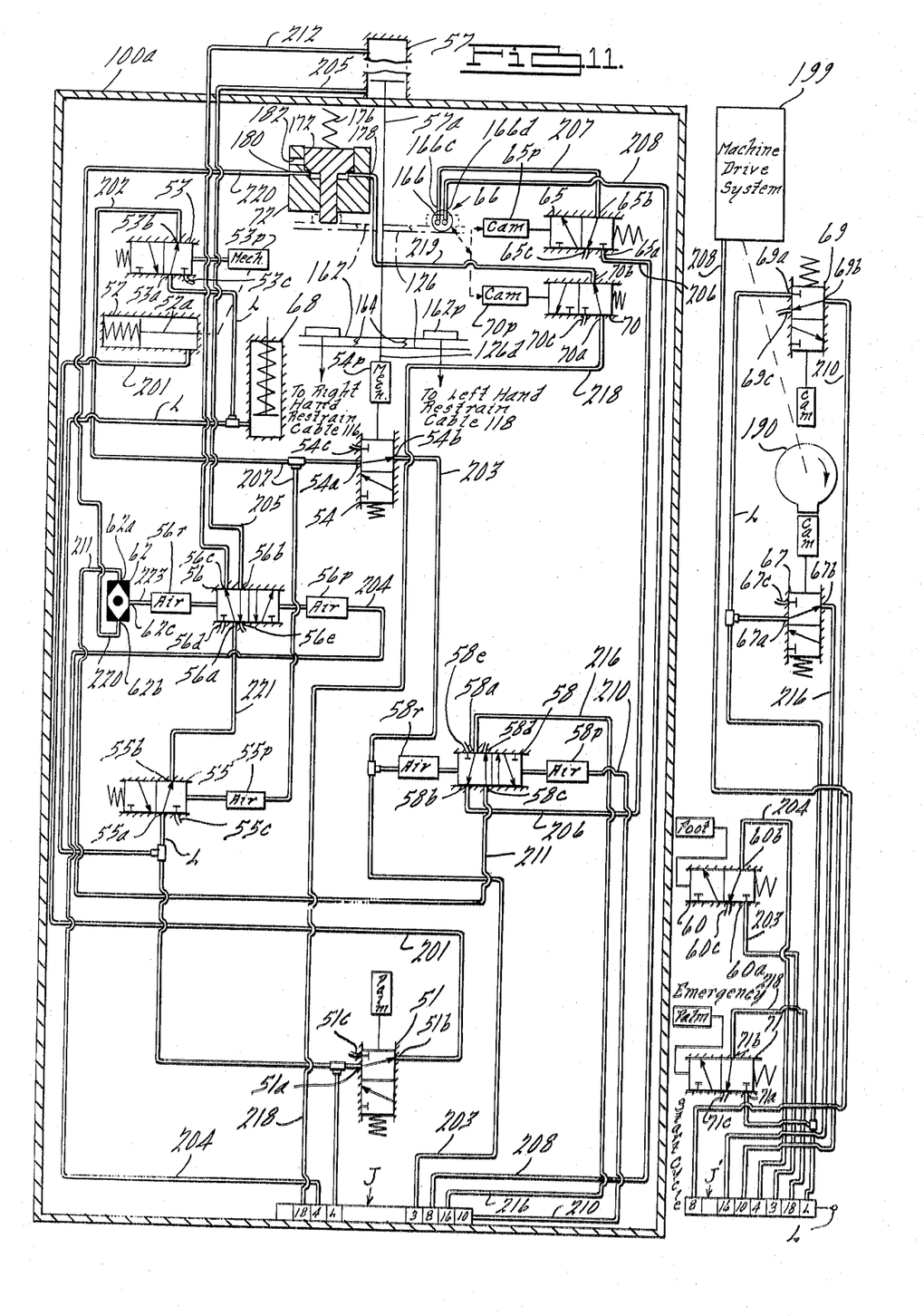
FIG. 11 is a schematic diagram of the pneumatic control circuit of the safety mechanism of FIG. 1.
Figure 12:
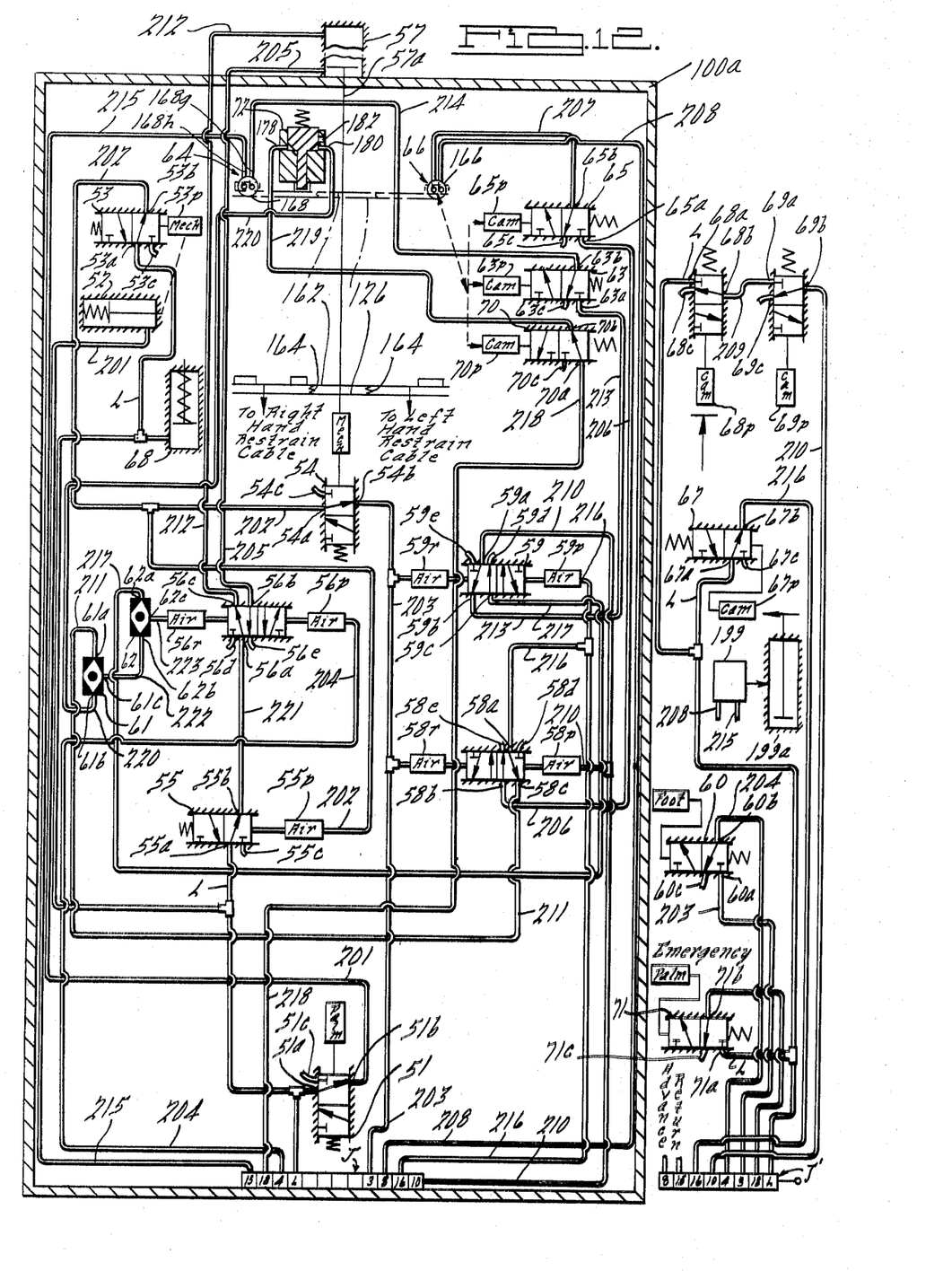
FIG. 12 is a schematic diagram of a modified form of pneumatic control circuit.

Body 160 is also constructed to provide a three-way exhaust valve which is identified by the numeral 72 in FIGS. 11 and 12. Valve 72 will herein be referred to as failsafe exhaust valve 72. As will be seen later, valve 72 forms a portion of an emergency release circuit. A bore 170 extends vertically through body 160 at one side thereof and the upper end thereof is doubly counter-bored as at 170a and 170b. A valving member 172 is slidably arranged within bore 170 and comprises a circular head 172a which fits snugly within counterbore 170b. One end of a spring 176 is contained within the bore 172b of member 172 and the other end of the spring bears against a cap 174 inserted into counterbore 170b so that spring 176 thereby biases member 172 to the illustrated position. In this position, head 172a abuts the shoulder between counterbores 170a and 170b and the lower end of member 172 protrudes from the bottom surface of member 160. A pair of holes, or ports, 178 and 180 for connection to pneumatic line fittings are fashioned in the side of member 160 facing wall 100e and small, thin passages 178a, 180a, respectively, extend from the interior ends thereof to intercept counterbore 170a. An exhaust passage 182 (FIGS. 7 and 8) is fashioned in member 160 to intercept counterbore 170b. In the illustrated position a pneumatic fluid path exists between holes 178 and 180. As will be seen in greater detail herein, in connection with the description of FIG. 11, when valve member 172 is displaced upwardly (i.e., to the left in FIGS. 8 and 10), the path between holes 178 and 180 is interrupted by being vented to exhaust via passage 182.

The schematic diagram of the pneumatic circuit for the safety mechanism of the present invention is shown in FIG. 11. The circuit is illustrated with cylinder 57 fully extended, i.e., hand restraints in the released position, and with the operator's foot pedal valve 60 not being actuated. The circuit has been reset and is ready for operation. In the ensuing description, all valves are selectively operable between an actuated position and a released (or returned) position. For mechanically or cam-actuated, or air-actuated spring-returned valves, the actuated position thereof refers to that position where the valve actuator is displaced against the bias of its spring, and the released position refers to the valve position to which the valve spool is normally biased by the spring. All air-actuated, air-return valves, are illustrated in the released, or returned, position. For the three failsafe valves 64, 66, 72, the actuated position refers to that position of the valves when cylinder rod 57a is fully retracted to the restraining position and the released position refers to the valve position when the cylinder rod 57a is displaced away from the fully retracted position.

The circuit of FIG. 11 comprises the following valves: reset valve 51 (described earlier in FIGS. 3 & 5), which is a two-position, three-way, spring-returned, palm-operated, normally closed type; pilot supply valve, 53 (described earlier in FIGS. 3 & 4), which is a two-position, three-way, spring-returned, mechanically-actuated type; control valve 54 (described earlier in FIG. 3), which is a two-position, three-way, spring returned, mechanically-actuated type; a supply valve 55, which is a two-position, three-way, spring-returned, air-actuated type; a master valve 56, which is a two-position, four-way, five-ported, air-returned, air-actuated type; a pilot valve 58, which is a two-position, four-way, five-ported, air-returned, air-actuated type; foot pedal valve, 60 (described earlier in FIG. 1), which is a two-position, three-way, spring-returned, foot-actuated type; a shuttle valve, 62, which is a shuttle type; cam vave, 65 (described earlier in FIGS. 3 & 4), which is a two-position, three-way, spring-returned, cam-actuated type; failsafe valve 66 (described earlier in FIGS. 7–10); a cam valve 67, which is a two-position, three-way, spring-returned, cam-actuated, normally closed type; a cam valve 69, which is a two-position, three-way, spring-returned, cam-actuated, normally closed type; cam valve 70 (described earlier in FIGS. 3 & 4), which is a two-position, three-way, spring-returned, cam-actuated, normally open type; an emergency valve 71, which is a two-position, three-way, spring-returned, palm button-actuated, normally closed type; and failsafe valve 72, described earlier in FIGS. 7–10. Valves 51, 55, 56 and 58 are contained in housing 100a but for sake of clarity, have been omitted in FIG. 3 and related mechanical drawing figures along with the pneumatic lines interconnecting the various valves.

Valves 67 and 69 are arranged for operation in predetermined relation to the operation of machine element 102a and along with valves 60 and 71 are located exteriorly of housing 100a. Various pneumatic circuit components within housing 100a must be operatively coupled with other pneumatic circuit components associated with machine 102. Connections of pneumatic lines are via junctions J and J' wherein similarly numbered connections are coupled together. For example, connection 3 of junction J is coupled with connection 3 of junction J', etc. Each pneumatic line so coupled is identified by the same numeral interiorly and exteriorly of housing 100a; for example, line 203 within housing 100a is coupled via connection 3 at junction J with line 203 via connection 3 at junction J'.

Proper valve actuation of valves 67 and 69 is attained by an operative coupling with machine 102. The operative coupling may be with any element (or elements) of machine 102 so long as valve 67 is operated to its actuated position when machine element 102a is stopped at its upper limit of travel and valve 69 is operated to its actuated position sometime during the stroke of element 102a (for example when element 102a is at its lower limit of travel). One possible way of actuating valves 67 and 69 is via a rotary cam 190 which rotates in sychronism with the stroke of machine element 102a, making one revolution for each stroke (one stroke being a downstroke and an upstroke). When machine element 102a is at its uppermost position (top dead center position), cam 190 is operating valve 67 to its actuated position as illustrated. As the machine begins an operating cycle, by stroking element 102a, cam 190 begins to rotate so that as element 102a begins its downstroke, valve 67 is released to its returned position. As element 102a comes to the bottom of its stroke (bottom dead center), cam 190 operates valve 69 to its actuated position. As element 102a returns on its upstroke, valve 69 is released, and as element 102a reaches the top of its stroke, at which point movement ceases, valve 67 is again actuated, and the operating cycle is concluded. Both valve 67 and valve 69 are normally closed when in their released positions, and hence with the illustrated arrangement, valve 67 opens only when element 102a is up and valve 69 opens only when element 102a is down.

Reset valve 51 is provided to reset the safety mechanism at the beginning of the operating sequence if resetting is required. The system air supply line L is connected to the inlet 51a of valve 51 and outlet 51b of valve 51 is coupled via a pneumatic line 201 with the rod end of cylinder 52. With this arrangement, when valve 51 is operated to the actuated position (as illustrated), it opens to supply air to cylinder 52 thereby displacing cylinder rod 52a (FIG. 3) to the retracted position and hence moving slide 152 out of the path of travel of member 126. Supply line L is also directly connected to the head end of cylinder 68. So long as sufficient line air pressure is available, cylinder 68 is extended to latch slide 169 in groove 152a to lock cylinder rod 52a in the retracted position, and hold slide 152 out of the path of travel of member 126. This condition is maintained after valve 51 is released to its return position only so long as sufficient line pressure exists. When the line pressure drops below a predetermined minimum, slide 169 unlatches slide 152 thereby permitting the latter to be disposed in the path of travel of member 126. Hence, a safety is provided in the event of loss of system pressure.

Supply line L also connects to inlet 53a of valve 53. The outlet 53b of valve 53 connects via a line 202 both to the inlet 54a of valve 54 and also to the air actuating pilot 55p of valve 55. The outlet 54b of valve 54 connects via a line 203 both to the air return pilot 58r of valve 58 and also via junctions J and J' to the inlet 60a of valve 60. The third port 54c of valve 54 vents to exhaust. The outlet 60b of valve 60 is coupled via a line 204 back through junctions J' and J to the air actuating pilot 56p of valve 56. The third port 60c of valve 60 vents to exhaust. Supply line L also connects to the linet 55a of valve 55. The outlet 55b of valve 55 connects via a line 221 to the inlet 56a of valve 56. The third port 55c of valve 55 vents to exhaust. The outlet 56b of valve 56 connects via a line 205 with the rod end of restraint cylinder 57. The head end of cylinder 57 connects via a line 212 to the return 56c of valve 56, and the fourth and fifth ports 56d, 56e, of valve 56 vent to exhaust.

Supply line L connects with inlet 67a of valve 67 and inlet 69a of valve 69. Outlet 67b of valve 67 connects via a line 216 through junctions J' and J to inlet 58a of valve 58. A third port 67c of valve 67 vents to exhuast. The outlet 69b of valve 69 connects via a line 210 through junctions J' and J to the air actuating pilot 58p of valve 58. The remaining port 69c of valve 69 vents to exahust. The outlet 58b of valve 58 connects via a line 206 to the inlet 65a of valve 65. The return 58c of valve 58 connects via a line 211 with one inlet 62a of shuttle valve 62. The remaining two ports 58d, 58e of valve 58 vent to exhuast. The outlet 62c of valve 62 connects via a line 223 to the air return pilot 56r of valve 56. The outlet 65b of valve 65 connects via a line 207 with hole 166c. Hole 166d connects via a line 208 through junctions J and J' to the machine drive system 199. The remaining port 65c of valve 65 vents to exhuast.

Supply line L also connects to inlet 71a of valve 71. Outlet 71b of valve 71 connects via a line 218 through junctions J', J to inlet 70a of valve 70. Valve 71 normally vents through leakage paths which exist in this type of valve and this is schematically illustrated by the third port 71c of valve 71 venting to exhuast. Outlet 70b of valve 70 connects via a line 219 with 178. The third port 70c of valve 70 connects to exhaust. Port 180 of failsafe valve 72 connects via a line 220 with the other inlet 62b of shuttle valve 62. It will be observed that the connections of lines 207, 208 at valve 66 may be reveresed without affecting system operation; also, the connections of lines 219 and 220 at valve 72 may be reversed.

In FIG. 11, valve member 162, and cable attaching member 126 are also schematically illustrated. The solid line positions of members 126 and 162 illustrate the released position (i.e., cylinder rod 57a extended), wherein the hand restraints can be moved in the released position for operator access to the machine work area. In the released position stud 126d of member 126 is actuating plunger 54p of valve 54. The broken line positions of members 162 and 126 illustrate the restraining position wherein valves 65, 66, 70 and 72 are operated to their actuated positions. The drawing, however, illustrates valves 65, 66, 70 and 72 in their return positions. It will be remembered, of course, that failsafe valves 66 and 72 are operated to their actuated positions by valve member 162 just prior to cable-attaching member 126 completing its final increment of travel to the restraining position, and that valves 65 and 70 are disposed for operation to their actuated positions by member 126 when the latter is in the restraining position.

The system operates as follows. During the reset operation, once slide 152 clears the path of travel of member 126, valve 53 is actuated, thereby opening to conduct air to inlet 54a and pilot 55p. Valve 55 is immediately actuated, thereby opening to conduct air to inlet 56a of valve 56. Note that so long as the system remains reset, valve 55 remains actuated to supply air at inlet 56a of valve 56. With machine element 102a stopped at its upper limit of travel, valve 67 is actuated, thereby being open to conduct air via line 216 to inlet 58a. Assuming for the moment that member 126 is in other than the released position, then valve 54, being in its return position, is closed and this prevents air from being supplied to pilot 58r. Accordingly, the air supplied to valve 58 from valve 67 is conducted through valve 58 to inlet 62a of shuttle valve 62. Shuttle valve 62 in turn supplies air to pilot 56r thereby operating valve 56 to the return position (i.e., the illustrated position). Note that pilot 56p vents to exhaust via valve 60. Valve 56 therefore now supplies air to the head end of cylinder 57 and vents the rod end of the cylinder to exhuast whereby member 126 is moved to the released position. The result is that if member 126 is in other than the released position when the system is being reset, member 126 will always cycle. Even if member 126 is initially in the released position at the beginning of the reset procedure, the pneumatic circuit operates in the same way, but no movement of cylinder rod 57a occurs. With member 126 is the released position, valve 54 is actuated thereby opening to conduct air to pilot 58r and to inlet 60a. Since pilot 58p is vented to exhaust via valve 69 with machine element 102a up, valve 58 is operated to the returned (illustrated) position when valve 54 is actuated. With valve 58 in the return position, it vents inlet 62a, and hence pilot 56r, to exhaust. This completes the reset procedure. The mechanism will remain in this condition until valve 60 is actuated by the machine operator.

When this happens, valve 60 conducts air to pilot 56p to thereby operate valve 56 to its actuated position, pilot 56r having been previously vented. The operation of valve 56 to the actuated position supplies air to the rod end of cylinder 57 and vents the head end of the cylinder to exhaust. Immediately, cylinder rod 57a operates members 126 and 162 toward the restraining position. As member 162 leaves the released position, valve 54 operates to its return position thereby removing pressure from pilot 58r and inlet 60a, and venting the same to exhaust via port 54c of valve 54. However, valve 58 remains in the return position until air is supplied to pilot 58p. Also valve 60 remains open until released by the operator, and when this happens, air is removed from pilot 56p; however, valve 56 remains in the actuated position until air is again supplied to pilot 56r. As both members 126 and 162 approach the restraining position, member 162 actuates failsafe valves 66 and 72 just prior to member 126 actuating valves 65 and 70. Thus, before valve 65 is actuated, bore 166 has been closed by pad 162p on member 162. This has been found to be beneficial to the failsafe valve system operation. Insofar as the emergency release circuit (to be described later) is concerned, benefit is derived by actuating valve 72 before valve 70.

When valve 58 operated to its return position, line air was immediately supplied via valves 67 and 58 to inlet 65a of valve 65. It will be observed that valve 65 is connected in series circuit with valve 66, and when both valves 65 and 66 are actuated, a fluid path is created from inlet 65a to the machine drive system 199 for machine 102. This fluid path is through valve 65, line 207, valve 66 and line 208. The signal transmitted via line 208 represents the cycle start signal for machine 102. Because of the unique operating arrangement of valves 66 and 65, the portion of this fluid path through valve 66 is created just prior to the creation of the portion of the path through valve 65. This is beneficial because closure of pad 162p on bore 166 is thereby totally unaffected by air discharged from bore 166 which would otherwise be the case if valve 65 were to open before pad 162p had closed on bore 166. According to this aspect of the invention, a cycle start signal is transmitted to the machine drive system 199 only when the safety mechanism is in the restraining position with both valves 66 and 65 being actuated; thus, a machine cycle cannot occur until the hand restraints are disposed in the restraining position positively removing both operator's hands from the path of travel of element 102a.

Furthermore, since the actual fluidic signal delivered to the machine must be transmitted through valve 66, and since valve 66 cannot transmit the signal until member 162 is physically abutting valve body 160, failsafe operation is attained.

When the drive system 199 receives the cycle start signal, element 102a is stroked. As element 102a downstrokes, valve 67 operates to its return position and this vents lines 208, 207, 206, 216 to exhaust via port 67c. In accordance with another feature of the invention it will be observed that at this time both lines 211 and 220 are vented to exhaust, the former via port 58d of valve 58 and the latter via failsafe valve 72, which as will be explained later, has been actuated. Thus, valve 56 is maintained in the actuated position to prevent cylinder 57 from being extended and this prevents the hand restraints from being operated away from the restraining position. As element 102a comes to the lower limit of its travel (i.e. completes its work stroke), valve 69 is actuated thereby opening to supply line air via line 210 to pilot 58p. Since pilot 58r has been previously vented to exhaust, valve 58 now operates to its actuated position. However, since valve 67 remains closed, the shifting of valve 58 to the actuated position produces no immediate effect. As element 102a begins its upstroke, valve 69 again closes and vents pilot 58p to exhaust.

As element 102a comes to the upper limit of its travel (i.e. completes its return stroke), valve 67 is again operated to its actuated position. (Note that valve 67 is arranged for actuation when the last moving element of the machine comes to rest; in this instance the element 102a is the last moving element to come to rest.) When so actuated, valve 67 opens to supply line air via line 216 to inlet 58a of valve 58. Since valve 58 is now in the actuated position, the line air is supplied via line 211 to shuttle valve 62 and hence pilot 56r. Valve 56 immediately operates to the return position thereby supplying line air to the head end of restraint cylinder 57 and venting the rod end of the cylinder. Cylinder 57 extends thereby releasing the hand restraints so that the operator may reach into the press to unload the present workpiece and load a new workpiece. As the hand restraint comes to the released position, valve 54 is actuated thereby operating valve 58 to the return position and supplying line air to the inlet 60a of valve 60 in preparation for the next operating cycle. This completes one operating cycle of the safety mechanism.

The emergency release circuit mentioned earlier comprises valve 71 and valve 72. Basically the emergency release circuit permits the hand restraints to be returned to their released position if for any reason one or both of the cables 116, 118 become fouled or snagged thereby preventing safety mechanism from being operated to the restraining position. With valve 72 in its non-actuated position, actuation of valve 71 supplies air through valve 72 to inlet 62b of shuttle valve 62. In turn valve 56 is operated by pilot 56r to its return position. Since actuation of valve 71 will customarily occur only when cylinder rod 57a is being retracted, valve 56 is always shiftable to the return position because pilot 56p vents to exhaust upon release of foot pedal valve 60. With valve 56 thus shifted to the return position, the travel of cylinder rod 57a is immediately reversed to operate the safety mechanism to the released position. The fouled cable(s) may then be cleared.

Valve 72 also provides a failsafe feature which disables the emergency release circuit when the safety mechanism is in the restraining position. Because the connection between lines 219 and 220 is broken when valve member 72 is displaced by valve member 162, valve 56 cannot be shifted to the return position with the safety mechanism in the restraining position. Since valve 70 is actuated just prior to actuation of valve 65, the emergency release circuit is disabled just prior to the transmission of the cycle start signal to the machine. Thus it is impossible for the hand restraints to be released by the emergency release circuit after the cycle start signal has been transmitted to the machine.

A modified form of the invention is illustrated in FIG. 12. The circuit of FIG. 12 is generally similar to that of FIG. 11 and hence the only differences between FIGS. 11 and 12 will be described in detail. Similar components in both Figures are identified by like numerals. The circuit of FIG. 12 can be used where machine element 102a stops during its cycle, for example at bottom dead center so that the workpiece can be unloaded by the operator before the element returns on its upstroke.

The circuit of FIG. 12 is illustrated in the same condition as the circuit of FIG. 11, that is with the system reset and the hand restraints in the released position. Both the safety circuit for sensing loss of line pressure and the emergency release circuit are the same in FIGS. 11 and 12. The arrangement and operation of valves 51, 53, 55, 56, 60, 65, 66, 67, 71 and 72 are also the same. Valves 62 and 58 and 69 are retained. However, the way in which these latter three valves are operatively coupled with the other components of the safety mechanism circuit and their operating relationship with machine 102 differs. Additional valves 63, 64 (mentioned earlier), 61, 59, 268 and 70 are utilized in the circuit of FIG. 12. Valve 59 is pilot valve of two-position, four-way, five-ported, air-return, air-actuated type; valve 61 is a shuttle valve, like valve 62; valve 63 is a cam valve of two-position, three-way, spring-return, cam-operated type; failsafe valve 64 is the failsafe valve described earlier in connection with FIGS. 7-10; valve 268 is a cam valve of two-position, three-way, spring-return, cam-operated, normally closed type. These five valves are connected in circuit in the following fashion. The air return pilot 59r of valve 59 is connected into line 203. Inlet 59a of valve 59 is coupled into line 210. Outlet 59b of valve 59 connects via a line 213 with inlet 63a of valve 63. Return port 59c of valve 59 connects via line 217 with inlet 62a of shuttle valve 62. The remaining two ports 59d and 59e of valve 59 vent to exhaust. Note that FIG. 12 shows valve 59 in the actuated position. The air actuating pilot 59p of valve 59 connects into line 216. Line 211 in FIG. 12 connects outlet 58c of valve 58 with inlet 61a of valve 61 instead of with inlet 62a of valve 62 as was the case in FIG. 11. Also the line 220 in FIG. 12 connects to the other inlet 61b of valve 61 rather than to inlet 62b as was the case in FIG. 11. The outlet 61c of valve 61 connects via a line 222 with the inlet 62b of valve 62. The arrangement for actuating valves 67, 268 and 69, which are associated with machine 102, is somewhat different from that in FIG. 11 where only valves 67 and 69 were associated with the machine. Supply line L connects to inlet 268a of valve 268 and outlet 268b of valve 268 connects via a line 209 with inlet 69a of valve 69. Port 268c of valve 268 vents to exhaust. The outlet 69b of valve 69 connects via line 210 back to pilot 58p and inlet 59a as mentioned earlier. The third port 69c of valve 69 vents to exhaust. Outlet 63b of valve 63 connects via a line 214 with hole 168g in block 160, the other hole 168h connecting via line 215 to machine drive control 199. The third port 63c of valve 63 vents to exhaust. Valve 63 and valve 64 are arranged identically to the arrangement of valves 65 and 66. Thus a fluid path is completed through valve 64 between lines 214 and 215 just prior to the operation of valve 63 to the actuated position thereby attaining the same benficial results as described earlier for valves 65 and 66.

Since the arrangement of machine 102 in FIG. 12 is somewhat different from that described in FIG. 11, the way in which valves 67, 268 and 69 operate is briefly described as follows. Valves 67 and 69 are operatively related with the stroke of element 102a in the same way as in FIG. 11. That is, valve 67 is actuated when element 102a is at its upper limit of travel (i.e. in the load position), and valve 69 is actuated when element 102a is at its lower limit of travel (i.e. after completing its work stroke). Valve 268 is operatively associated with a clamping cylinder mounted on machine 102. The clamping cylinder is actuable by a circuit (not illustrated) to clamp and release a workpiece in the machine. The clamp is actuated after the operator loads a workpiece and before the machine cycle begins. After the completion of the work stroke of element 102a, the clamping cylinder is operated to release the workpiece. When the cylinder has been thusly operated, valve 268 is operated to its actuated position. With valve 69 already being actuated, the actuation of valve 268 completes a series circuit from line L through valves 268 and 69 via line 210 to inlet 59a of valve 59, and also to pilot 58p of valve 58.

The overall operation of the circuit of FIG. 12 can be explained at this point. After a workpiece has been loaded in machine 102, the operator actuates valve 60. The safety mechanism operates to the restraining position in the same fashion as described in FIG. 11. When the clamping cylinder releases the formed workpiece, valve 58 operates to the actuated position. The operation of valve 58 to the actuated position has no immediate effect since air is not presently supplied at inlet 58a. However, the application of air to inlet 59a causes air to be supplied via line 217 to operate valve 56 to the return position. Hence cylinder rod 57a extends operating the safety mechanism to the released position. Now the operator has access to the work area for unloading the completed workpiece. With cylinder rod 57a extended, actuation of valve 54 operates valve 59 to the return position since pilot 59p has been vented via valve 67. Valve 58 remains in its actuated position. In order to return element 102a to the load position, the operator again operates foot pedal valve 60 to the actuated position. This supplies air via line 204 to valve 56 which in turn retracts cylinder rod 57a operating the safety mechanism to the restraining position. As member 126 releases valve 54, air is removed from both pilots 58r and 59r, but both valves stay in their present positions. Because valve 59 is in the return position and both valves 268 and 69 are being actuated, line air is supplied via these three valves to inlet 63a of valve 63. When the valving member 162 abuts valve body 160, bore 168 is closed to complete a pneumatic circuit between lines 215 and 214. As cylinder rod 57a traverses its final increment of travel to the restraining position, valve 63 is actuated by member 126 and this completes a fluidic circuit through valves 63 and 64 via line 215 to machine drive system 199. Element 102a now returns to the load position while hand restraints are maintained in the restraining position. As element 102a begins to upstroke, valve 69 is released removing line air from line 210 to vent pilot 58p to exhaust. Valve 58 remains in its actuated position and valve 59 in its return position. When element 102a arrives at top dead center (or alternatively when the last moving part on the machine has stopped), valve 67 is again actuated to supply air to pilot 59p and inlet 58a. Valve 59 shifts to the actuates position but this has no effect since there is no air at inlet 59a. However, valve 58 transmits the air at inlet 58a via line 211 to shuttle valve 62 and from there via shuttle valve 62 to pilot 56r. Valve 56 operates to the return position thereby operating the safety mechanism to the released position. When cylinder rod 57a is in the extended position, valve 54 is again operated to actuate pilots 58r, 59r and supply air to inlet 60a of foot pedal valve 60 preparatory to the subsequent machine cycle. Since pilot 58p is being vented via valve 69, valve 58 shifts to the return position. Valve 59 remains in the actuated position. The operating cycle is now concluded, and the operator can load a new workpiece into the machine.

It is to be understood that the foregoing description is that of a preferred embodiment of the invention. Various changes and modifications may be made without departing from the spirit and scope of the invention as defined by the appended claims.

I claim:

1. A hand restraint safety apparatus for use by an operator of a machine having at least one machine element which moves during each machine operating cycle, said apparatus comprising hand restraint means for the hands of the machine operator, hand restraint moving means operatively coupled with said hand restraint means for controlling the movement of said hand restraint means between a released position which permits at least one of the operator's hands to be disposed in the path of travel of said at least one machine element and a restraining position which prevents both of the operator's hands from being disposed in the path of travel of said at least one machine element and control means for interlocking the machine with said hand restraint moving means comprising means for permitting a machine operating cycle to begin only when said hand restraint means is in the restraining position.

2. The apparatus of claim 1 wherein said control means includes means for maintaining said hand restraint means in the restraining position during the machine operating cycle.

3. The apparatus of claim 2 wherein said control means includes means for operating said hnad restraint moving means after completion of the machine operating cycle such that said hand restraint means may be moved to the released position.

4. The apparatus of claim 1 wherein said control means includes emergency control means operatively coupled with said hand restraint moving means such that with said hand restraint moving means moving said hand restraint means toward the restraining position, actuation of said emergency control means causes said hand restraint moving means to reverse the travel of said hand restaint means whereby the latter may be moved toward the released position.

5. The apparatus of claim 4 wherein said control means includes means for preventing said emergency control means from being actuated when said hand restraint means is in the restraining position whereby said hand restraint means is prevented from being moved away from the restraining position.

6. The apparatus of claim 1 wherein said control means includes reset means adapted to be actuated at start-up for operating said hand restraint moving means such that said hand restraint means may be moved to the released position upon actuation of said reset means.

7. The apparatus of claim 1 wherein said control means comprises a failsafe sensing means for sensing when said hand restraint means is in the restraining position, starting means adapted to be actuated by the machine operator for supplying a machine starting signal and means for transmitting the machine starting signal to the machine only when said failsafe sensing means senses that said hand restraint means is in the restraining position.

8. The apparatus of claim 7 wherein said failsafe sensing means is actuated to sense said hand restraint means being in the restraining position by mechanical abutment of said hand restraint moving means with said failsafe sensing means.

9. The apparatus of claim 8 wherein said failsafe sensing means comprises a pair of sensing elements which must both be operated to their actuated positions in order for the machine starting signal to be transmitted to the machine.

10. The apparatus of claim 9 wherein said pair of sensing elements comprises a pair of fluid valves.

11. The apparauts of claim 10 wherein said two fluid valves are fluidically connected in series with each other and when both are operated to their actuated positions open to form a fluid circuit from said starting means to the machine, said machine starting signal thereby being transmitted through said two valves from said starting means to the machine.

12. The apparatus of claim 1 wherein said control means includes means for preventing said hand restraint moving means from moving said hand restraint means away from the restraining position during the machine operating cycle.

13. A hand-restraint safety apparatus for use by an operator of a machine having at least one machine element which moves during each machine operating cycle, said apparatus comprising hand restraint means for the hands of the machine operator, hand restraint moving means operatively coupled with said hand restraint means for controlling the movement of said hand restraint means between a released position which permits at least one of the operator's hands to be disposed in the path of travel of said at least one machine element and a restraining position which prevents both of the operator's hands from being disposed in the path of travel of said at least one machine element and control means for interlocking the machine with said hand restraint moving means comprising starting means actuable by the machine operator for suppling a starting signal, means responsive to the starting signal for causing said hand restraint moving means to move said hand restraint means to the restraining position and means for transmitting the starting signal to the machine to thereby initiate a machine operating cycle only after said hand restraint means has arrived at the restraining position whereby the machine operator's hands are positively removed from the path of travel of said at least one machine element before a machine operating cycle is initiated.

14. The apparatus of claim 13 wherein said control means includes means for preventing said hand restraint moving means from moving said hand restraint means away from the restraining position during the machine operating cycle.

15. The apparatus of claim 14 wherein said control means includes means for operating said hand restraint moving means after completion of the machine operating cycle such that said hand restraint means may be moved to the released position.

16. The apparatus of claim 13 wherein said starting means comprises means for supplying said starting signal in fluidic signal form and said means for transmitting the starting signal to the machine when said hand restraint means has arrived at the restraining position comprises a failsafe valve means which is actuated when said hand restraint means is at the restraining position and which, when actuated, forms a fluid path through which the starting signal is transmitted to the machine.

17. A hand restraint safety apparatus for use by an operator of a machine having at least one machine element which moves during each machine operating cycle, said apparatus comprising hand restraint means for the hands of the machine operator, hand restraint moving means operatively coupled with said hand restraint means comprising a fluid actuator means operable between released and restraining positions for controlling the movement of said hand restraint means between a released position which permits at least one of the operator's hands to be disposed in the path of travel of said at least one machine element and a restraining position which prevents both of the operator's hands from being disposed in the path of travel of said at least one machine element and control means for interlocking the machine with said hand restraint means comprising a master valve means selectively operable to actuated and returned positions and operatively coupled with said fluid actuator means such that when said master valve means is in the actuated position, said fluid actuator means is operated to displace said hand restraint means to its restraining position and when said master valve means is in the returned position, said fluid actuator means is operated to its released position to permit said hand restraint means to be displaced to its released position, means for operating said master valve means to the actuated position comprising a first signal producing means actuable by the operator to produce a first signal, means operatively coupling said first signal producing means with said master valve means such that said master valve means is operated to the actuated position in response to the first signal whereby said fluid actuator means is operated to its restraining position to similarly displace said hand restraint means to its restraining position, a second signal producing means for producing a second signal, sensing means for sensing when said hand restraint means is in its restraining position, means operatively coupling said second signal producing means with said sensing means for conducting said second signal to said sensing means, means operatively coupling said sensing means with the machine such that the second signal is transmitted to the machine only when said sensing means senses that said hand restraint means is in its restraining position, said machine being enabled to commence an operating cycle only upon receiving said second signal.

18. The apparatus of claim 17, including a machine sensing means operatively coupled with the machine for supplying a machine cycle complete signal indicative of the machine having executed an operating cycle, means operatively coupling said machine sensing means with said master valve means such that said master valve means is operated to the returned position in response to the machine cycle complete signal to thereby operate said fluid actuator means to its released position and permit said hand restraint means to be displaced to its released position.

19. The apparatus of claim 18 wherein said first mentioned sensing means comprises a failsafe valve means operatively coupled with the machine and said second signal producing means, said failsafe valve means conducting the second signal from said second signal producing means to the machine only when said hand restraint means is in its restraining position.

20. The apparatus of claim 19 wherein said failsafe valve means comprises closure means movable with said fluid actuating means, a valve body disposed in the path of travel of said closure means, a pair of bores in said body open toward said closure means, said closure means and said valve body being arranged and constructed such that when said hand restraint means is in its restraining position, said closure means abuts said valve body to complete a fluid path between said two bores, said two bores being operatively coupled with said second signal producing means and the machine such that said second signal can be conducted to the machine only when said fluid path is completed between said two bores by said closure means.

21. The apparatus of claim 20 wherein said failsafe valve means comprises an additional valve means operable to actuated and returned positions and positioned to be operated to the actuated position when said hand restraint means is in its restraining position, said additional valve means being operatively coupled in circuit with one of said bores such that said one bore is closed when said additional valve means is in the returned position and said one bore is open when said additional valve means is in the actuated position.

22. The apparatus of claim 21 wherein said closure means is arranged to complete said fluid path between said two bores before said additional valve means is operated to the actuated position.

23. The apparatus of claim 19 wherein said means operatively coupling said second signal producing means with said failsafe valve means comprises a pilot valve means operable to actuated and returned positions, said pilot valve means being operatively coupled with said second signal producing means and said failsafe valve means such that when said pilot valve means is in the actuated position the second signal is transmitted to said failsafe valve means, said pilot valve means being operated to the actuated position when said hand restraint means is operated from its released position toward its restraining position.

24. The apparatus of claim 19 wherein said means operatively coupling said machine sensing means with said master valve means comprises a pilot valve means operable to actuated and returned positions, said pilot valve means being operatively coupled with said machine sensing means and said master valve means such that said machine cycle complete signal can be transmitted to said master valve means only when said pilot valve means is in the returned position.

25. The apparatus of claim 24 wherein said pilot valve means is operated to the returned position during the machine operating cycle but said machine cycle complete signal is supplied to said pilot valve means for transmission therethrough to said master valve means only when the machine operating cycle has been completed.

26. The apparatus of claim 19 wherein said failsafe valve means comprises a pair of valves each operable to actuated and returned positions and positioned such that both are operated to their actuated positions only when said hand restraint means is in its restraining position, said pair of valves being operatively coupled in circuit with said second signal producing means and the machine such that the second signal is transmitted to the machine only when both of said pair of valves are in their actuated positions.

27. The apparatus of claim 26 wherein one of said pair of valves is operated to its actuated position just prior to said hand restraint means arriving at its restraining position and the other of said pair of valves is operated to its actuated position when said hand restraint means arrives at its restraining position.

28. The apparatus of claim 17 wherein said fluid actuator means comprises a fluid actuated cylinder.

29. The apparatus of claim 28 wherein said fluid actuator cylinder is a pneumatic cylinder.

30. The apparatus of claim 17 wherein said second signal producing means comprises a machine valve operatively coupled with the machine such that said second signal is supplied only when the machine is between operating cycles.

31. The apparatus of claim 17 wherein said control means comprises emergency control means operatively coupled with said fluid actuator means such that with said fluid actuator means moving said hand restraint means toward its restraining position, actuation of said emergency control means causes said fluid actuator means to reverse its travel whereby said hand restraint means is permitted to be moved toward it's released position.

32. The apparatus of claim 31 wherein said control means includes means for preventing actuation of said emergency control means when said hand restraint means is in its restraining position whereby said hand restraint means is prevented from being moved away from its restraining position.

33. A hand restraint safety apparatus for use by an operator of a machine having at least one machine element which moves during each machine operating cycle, said apparatus comprising a mounting base, hand restraint means for the hands of the machine operator, hand restraint moving means on said base controllably operable to a restraining position and to a released position, coupling means operatively coupling said hand restraint moving means with said hand restraint means such that when the hand restraint moving means is in the released position, said hand restraint means may be disposed in a released position wherein at least one of the machine operator's hands can be disposed in the path of travel of said at least one machine element and when said hand restraint moving means is in the restraining position said hand restraint means is disposed in a restraining position wherein neither of the operator's hands can be disposed in the path of travel of said at least one machine element and control circuit means for interlocking the machine with said hand restraint moving means comprising a failsafe sensing means on said base operative to actuated and non-actuated positions and connected in control circuit with the machine such that the machine can be cycled only when said failsafe sensing means is in its actuated position, said failsafe sensing means being arranged on said base for operation to its actuated position by said hand restraint moving means only when the latter is in its restraining position.

34. The apparatus of claim 33 wherein said coupling means includes a failsafe sensing means actuating means movable with said hand restraint moving means and arranged to operate said failsafe sensing means, said failsafe sensing means actuating means being arranged to operate said failsafe sensing means to the actuated position when said hand restraint moving means is in its restraining position.

35. The apparatus of claim 34 wherein said failsafe sensing means comprises a failsafe valve means operatively coupled in control circuit with the machine.

36. The apparatus of claim 35 wherein said failsafe sensing means actuating means comprises a member forming a portion of said coupling means and movable with said hand restraint moving means.

37. The apparatus of claim 36 wherein said failsafe valve means comprises a closure means mounted on said member and a valve body disposed in the path of travel of said closure means, a pair of bores in said body open toward said closure means, said closure means and said valve body being arranged and constructed such that when said hand restraint moving means is in the restraining position, said closure means abuts said valve body to complete a fluid path between said two bores, said two bores being operatively coupled in control circuit with the machine such that the machine can be cycled only when said fluid path is completed between said two bores by said closure means, said fluid path occurring only when said failsafe valve means is in the actuated position.

38. The apparatus of claim 37 wherein said failsafe valve means comprises an additional valve means operable to actuated and returned positions and positioned to be operated to the actuated position when said hand restraint moving means is in its restraining position, said additional valve means being operatively coupled in control circuit with one of said bores such that said one bore is closed when said additional valve means is in the returned position and said one bore is open when said additional valve means is in the actuated position.

39. The apparatus of claim 38 wherein said additional valve means is arranged for operation to its actuated position by said member.

40. The apparatus of claim 38 wherein said closure means is arranged to complete said fluid path between said two bores before said additional valve means is operated to the actuated position.

41. The apparatus of claim 37 wherein said control circuit means includes emergency control circuit means operatively coupled with said hand restraint moving means such that with said hand restraint moving means moving said hand restraint means toward the restraining position, actuation of said emergency control means reverses the travel of said hand restraint moving means whereby said hand restraint means may be moved toward the released position.

42. The apparatus of claim 41 wherein said emergency control circuit means includes an actuator therefor adapted to be actuated by the machine operator.

43. The apparatus of claim 41 wherein said control circuit means includes means for preventing said emergency control circuit means from being actuated when said hand restraint means is in the restraining position whereby said hand restraint means is prevented from being moved away from the restraining position by said emergency control circuit means.

44. The apparatus of claim 37 wherein said hand restraint moving means comprises a power cylinder having a cylinder rod, said cylinder rod being operatively coupled with said hand restraint means in a said coupling means, said valve body comprising a bore, said cylinder rod passing through said valve body bore.

45. The apparatus of claim 44 wherein said closure means is yieldably mounted on the rod of said power cylinder and said control circuit means includes an additional valve means operable to actuated and returned positions and positioned to be operated to the actuated position when said hand restraint moving means is in its restraining position, said additional valve means being operatively coupled in control circuit with one of said bores such that said one bore is closed when said additional valve means is in the returned position and said one bore is open when said additional valve means is in the actuated position, said closure means being operated to complete said fluid path through said two bores just prior to said additional valve means operated to its actuated position.

46. The apparatus of claim 33 including a safety circuit means for preventing said failsafe sensing means from being operated to its actuated position in the event of loss of power to the apparatus.

47. The apparatus of claim 46 including reset circuit means for resetting the apparatus after the loss of power has been corrected.

48. A fluid-operated, hand restraint safety apparatus for use by an operator of a machine having at least one machine element which moves during each machine operating cycle, said apparatus comprising fluid-powered actuating means movable between released and restraining positions, hand restraint means, means operatively coupling said fluid-powered actuating means with said hand restraint means such that as said fluid-powered actuating means is operated between released and restraining positions, movement of said hand restraint means is controlled between a released position wherein at least one of the operator's hands can be disposed in the path of travel of said at least one machine element and a restraining position wherein neither of the operator's hands can be disposed in the path of travel of said at least one machine element and fluid control circuit means for interlocking the machine with said fluid-powered actuating means such that a machine operating cycle can begin only when said hand restraint means is in its restraining position.

49. The apparatus of claim 48 wherein said fluid control circuit means comprises a master valve means and means operatively coupling said master valve means with said fluid-powered actuating means to control the operation thereof, said master valve means being operative between actuated and returned positions and coupled with said fluid-powered actuating means such that the latter is operated to the restraining position when said master valve means is in the actuated position and said fluid-powered actuating means is operated to the released position when said master valve means is operated to the returned position, said master valve means being operated to the actuated position prior to the beginning of a machine operating cycle and being maintained in the actuated position until the machine cycle is completed.

50. The apparatus of claim 49 including means operatively coupling said master valve means with the machine such that said master valve means is operated to the returned position at the completion of the machine operating cycle.

51. The apparatus of claim 49 including emergency release circuit means comprising an actuator and means responsive to operation of said actuator for operating said master valve means from the actuated position to the returned position while said fluid-powered actuating means is being operated to move said hand restraint means toward its restraining position whereby operation of said actuator reverses the travel of said fluid-powered actuating means to be reversed thereby permitting said hand restraint means to be returned toward its released position.

52. The apparatus of claim 51 wherein said emergency release circuit means comprises an exhaust valve means operative to actuated and non-actuated positions and operatively coupled in circuit with said master valve means and the actuator of said emergency release circuit means, said exhaust valve means being operated to the actuated position when said fluid-powered actuating means is in the restraining position to operatively disconnect said actuator from said master valve means thereby disabling said emergency release circuit means.

53. The apparatus of claim 52 including shuttle valve means operatively coupling said master valve means with said exhaust valve means and the machine such that said master valve means can be operated to the returned position by said actuator only when said exhaust valve means is in the non-actuated position and by the machine only at the completion of the machine operating cycle.

54. The apparatus of claim 48 wherein said apparatus is operative from a source of pressure fluid and includes a safety means for preventing said fluid-powered actuating means from operating to its restraining position from its released position when the fluid pressure drops below a predetermined level.

55. The apparatus of claim 48 wherein said apparatus is operative from a source of pressure fluid and includes a safety means for preventing said fluid-powered actuating means from operating to its released position from its restraining position when the fluid pressure drops below a predetermined level.

56. The apparatus of claim 48 wherein said apparatus is operative from a source of pressure fluid and includes a safety means for preventing said fluid-powered actuating means from operating from one position to the other when the fluid pressure drops below a predetermined level, said safety means comprising a mechanical interlock means which is disposable to interrupt the travel of said fluid-powered actuating means when the fluid pressure drops below said predetermined level.

57. The apparatus of claim 56 wherein said fluid control circuit means includes means for resetting the apparatus after the pressure has been returned to above said predetermined level such that said mechanical interlock means is removed from the path of travel of said fluid-powered actuating means.

58. The apparatus of claim 56 including a member movable with said fluid-powered actuating means, means biasing said mechanical interlock means toward the path of travel of said member and means overcoming said bias means to hold said mechanical interlock means out of the path of travel of said member so long as fluid pressure exceeds said predetermined level.

59. The apparatus of claim 58 wherein said means for holding said mechanical interlock means out of the path of travel of said member comprises a cylinder operatively connected to sense fluid pressure and comprising a cylinder rod, means biasing the cylinder rod in the direction opposite that in which the fluid pressure urges the cylinder rod, said cylinder rod being arranged to interlock with said mechanical interlock so long as pressure remains above said predetermined level.

60. The apparatus of claim 58 wherein said fluid control circuit means includes a pilot supply valve means operable to an actuated and a returned position and positioned to be operated to the actuated position by said mechanical interlock means when the latter is out of the path of travel of said member and means operatively coupling said pilot supply valve means in control circuit with said fluid actuating means such that the hand restraint means cannot be operated to the restraining position unless said pilot supply valve means is in its actuated position.

61. The apparatus of claim 60 wherein said fluid control circuit means includes an additional valve means operable to an actuated and returned position and positioned to be operated to the actuated position only when said fluid actuating means is in its released position, said additional valve means being coupled in circuit with said pilot supply valve means such that said fluid actuating means cannot be operated unless said hand restraint means is in the released position.

62. The apparatus of claim 48 wherein said apparatus is operative from a source of pneumatic pressure.

63. The apparatus of claim 1 wherein said hand restraint means is physically engaged with the operator's hands when the apparatus is in use.

64. The apparatus of claim 13 wherein said hand restraint means is physically engaged with the operator's hands when the apparatus is in use.

65. The apparatus of claim 17 wherein said hand restraint means is physically engaged with the operator's hands when the apparatus is in use.

66. The apparatus of claim 33 wherein said hand restraint means is physically engaged with the operator's hands when the apparatus is in use.

67. The apparatus of claim 48 wherein said hand restraint means is physically engaged with the operator's hands when the apparatus is in use.

68. A hand restraint safety apparatus for use by an operator of a machine having at least one machine element which moves during each machine operating cycle, said apparatus comprising hand restraint means for the hands of the machine operator, hand restraint moving means operable from a source of power and operatively coupled with said hand restraint means for operating said hand restraint means between a released position which permits at least one of the operator's hands to be disposed in the path of travel of said at least one machine element and a restraining position which prevents both of the operator's hands from being disposed in the path of travel of said at least one machine element, control means operatively coupling said source of power, said hand restraint moving means and the machine for controlling the application of power from said source to said hand restraint moving means in accordance with the operation of said at least one machine element thereby to controllably operate said hand restraint means between the restraining and released positions thereof, safety means responsive to a given operating characteristic of said source of power for providing a safety signal in response to an undesired condition of said operating characteristic and overriding means responsive to said safety signal for overriding the control of said hand restraint moving means by said control means.

69. The apparatus of claim 68 wherein said overriding means comprises means for preventing said hand restraint moving means from operating said hand restraint means to the released position when said undesired condition of said operating characteristic occurs with the hand restraint means in the restraining position.

70. The apparatus of claim 68 wherein said overriding means comprises means for preventing said hand restraint moving means from operating said hand restraint means to the restraining position when said undesired condition of said operating characteristic occurs when said hand restraint means is in the released position.

71. The apparatus of claim 68 wherein said control means includes interlocking means for interlocking the machine with said hand restraint moving means to permit a machine operating cycle to begin only when said hand restraint means is in the restraining position and said overriding means comprises means for preventing said hand restraint moving means from operating said hand restraint means to the restraining position when said undesired condition of said operating characteristic occurs with the hand restraint means in the released position thereby to prevent a machine cycle.

72. The apparatus of claim 68 wherein said source of power comprises a source of pressure fluid and said safety means is responsive to the pressure of said fluid for providing said safety signal when the pressure of said fluid drops below a predetermined value.

73. The apparatus of claim 72 wherein said source of pressure fluid comprises a source of pneumatic pressure.

74. The apparatus of claim 68 wherein said hand restraint moving means is operable over a given path of travel to operate said hand restraint means between the released position and the restraining position and said overriding means is disposed to interrupt the travel of said hand restraint moving means in response to said undesired condition of said operating characteristic.

75. The apparatus of claim 74 wherein said overriding means is disposed to interrupt the travel of said hand restraint moving means intermediate the limits of travel thereof.

76. The apparatus of claim 68 wherein said hand restraint means is physically engaged with the operator's hands when the apparatus is in use.

* * * * *